June 20, 1944.　　　M. G. LEONARD　　　2,351,984
PROTECTIVE DEVICE FOR ELECTRICAL APPARATUS
Filed Dec. 5, 1941　　　3 Sheets-Sheet 3

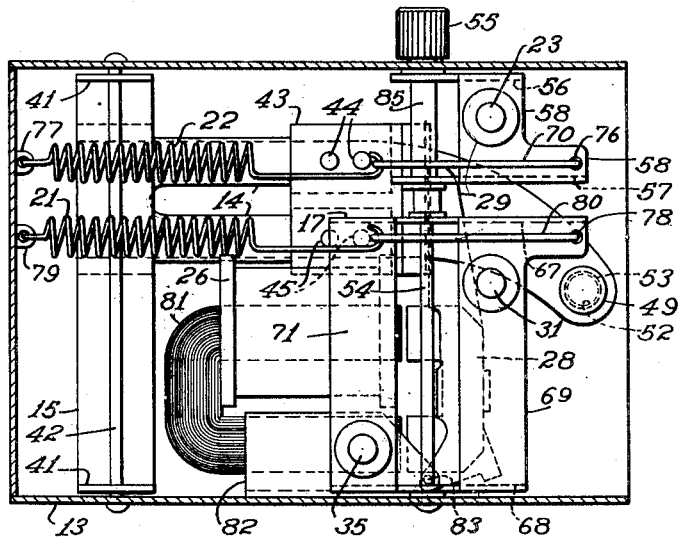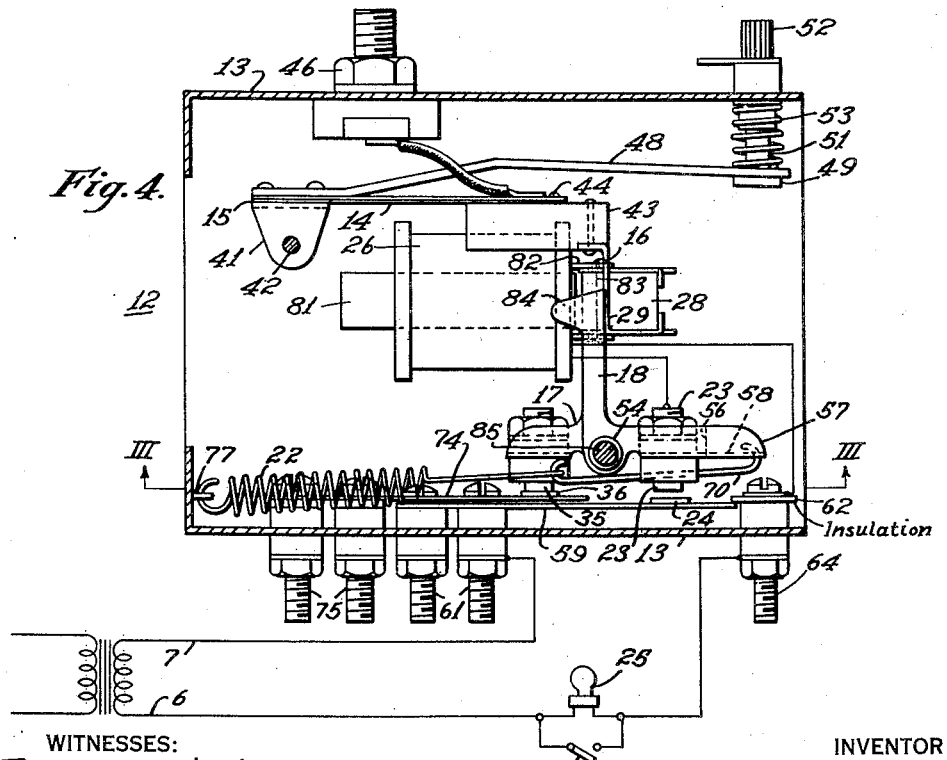

WITNESSES:
Edward Michaels

INVENTOR
Merrill G. Leonard.
BY
Franklin E. Hardy
ATTORNEY

Patented June 20, 1944

2,351,984

UNITED STATES PATENT OFFICE 2,351,984

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application December 5, 1941, Serial No. 421,787

8 Claims. (Cl. 177—311)

The invention relates to protective devices for electrical apparatus and, more particularly, to circuit-controlling devices for use in electrical apparatus, such as transformers.

In such electrical apparatus, it is frequently desired to provide means for protecting the apparatus from damage that may be caused by overheating due to overloading the apparatus, and it is common to provide a circuit breaker controlled by a thermally responsive element operative to interrupt the load circuit of the apparatus upon occurrence of a predetermined condition. A condition that might be used for causing the circuit breaker to operate to interrupt the load circuit is heating, resulting from an overload that is sustained for too long a period. The thermally responsive element may also be effective to give an indication, somewhat prior to the occurrence of the condition necessary to unload the apparatus, that such a condition is nearly reached.

In distribution apparatus where the amount of power used per unit is small, it is usual to provide the circuit breaker as above-described for directly interrupting the load circuit on the low-voltage side, and to provide mechanical means having an operating handle extending outside the apparatus casing for resetting the thermally responsive control device after it has operated in response to the predetermined condition, so that the device will again be ready to operate upon a repetition of the condition. In larger transformers, the same type of circuit breaker device may be used as a relay for controlling a main breaker, so that both sets of contacts, that is, those which control an alarm or indicating circuit to signal that the load on the apparatus is approaching the limiting value and those which control the circuit for interrupting the main load circuit, may both be used to control relay circuits. In polyphase apparatus, a number of relays may be necessary, as, for example, three relays in a three-phase system, one relay connected to be responsive primarily to the condition in one only of the three phase conductors. It will be apparent that in such apparatus it becomes complicated to provide for mechanical resetting of each of these relays after operation thereof, and for also resetting the circuit breakers controlled by operation of these relays.

It is an object of the invention to provide protective means for electrical apparatus, such as transformers, including a circuit-controlling device that is operable in response to a predetermined condition of the apparatus for closing an electric circuit, an electrically operated resetting device for the circuit-controlling device, and means operable after the closing of the circuit for effecting operation of the resetting device for returning the parts of the circuit-controlling device to their initial positions, so that the apparatus is in condition for subsequent operation upon a reoccurrence of the predetermined condition.

It is a further object of the invention to provide a relay device of the above-indicated character having two releasable latches thermally controlled for controlling the operation of an indicating circuit and a load controlling circuit, respectively, upon predetermined conditions of the apparatus, one of the circuits including a high impedance indicating device and a resetting element for the circuit-controlling device, the circuit of which is closed upon the release of the latch, but is not sufficiently energized for operation when connected in series with the indicating device, together with means for shunting the indicating device from the circuit for actuation of the latching members to their initial position.

Other objects and advantages of the invention will be apparent from the following description when read in conjunction with the accompanying drawings, in which:

Fig. 3 is a horizontal sectional view of the relay device taken on the line III—III of Fig. 4;

Fig. 4 is a vertical sectional view taken along the line IV—IV of Fig. 2;

Figure 1:
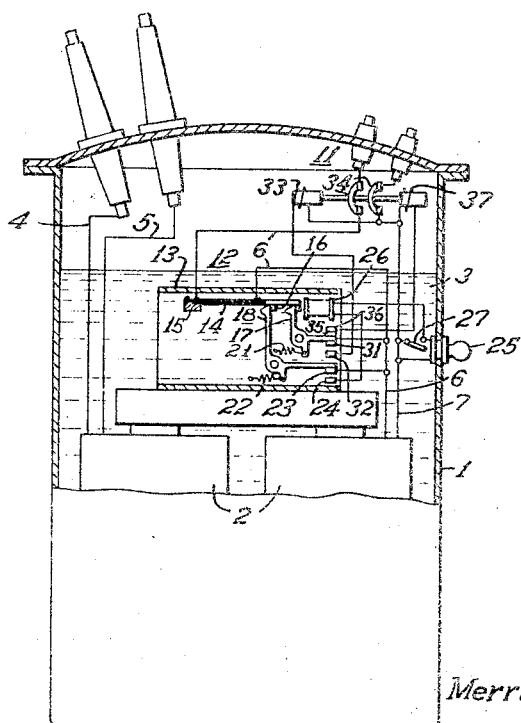
Figure 1 is a simplified diagrammatic view of circuits and apparatus illustrating the application of a thermally controlled relay device for controlling an indicating circuit, and a circuit breaker control circuit.

Referring to the drawings, and more particularly to Fig. 1 thereof, an electrical apparatus is illustrated including an apparatus casing 1 housing a core and coil assembly 2 immersed in an insulating liquid 3, and provided with high-voltage terminal conductors 4 and 5 and low-voltage terminal conductors 6 and 7 which may be connected to high-voltage and low-voltage external circuits through conventional bushings in a well-known manner. A circuit breaker indicated generally at 11 is provided for connecting the conductors 6 and 7 to the outside circuit, and is controlled by a relay indicated generally at 12 immersed in the insulating liquid 3 and comprises a casing 13 enclosing a bimetal element 14 that is shown included in the circuit of conductor 6, so that the bimetal element is responsive to both the flow of current therethrough and heating resulting from the temperature of the liquid 3 in which it is immersed. The bimetal element 14 is physically arranged so that one end is mounted on a relatively fixed abutment 15, and the other end is free to move and carries a catch 16 that is adapted to engage latches 17 and 18 to normally retain them in their illustrated positions against the pull of the springs 21 and 22, respectively. The latches 17 and 18 are so arranged that the latch 18 has the lesser overlap with the catch 16, so that as the bimetal 14 is heated and the catch 16 moves upwardly the latch arm 18 will be the first to be released and will be forced by the spring 22 to close contacts 23 and 24, thus completing a circuit from the source represented by conductors 6—7 through a high impedance indicating device such as a lamp 25 and a resetting coil 26 of the relay 12. The closing of this circuit notifies the operator that the apparatus is loaded nearly to its maximum capacity, thus giving an opportunity to rearrange the load and prevent further increase in the heating of the apparatus.

Figure 2:
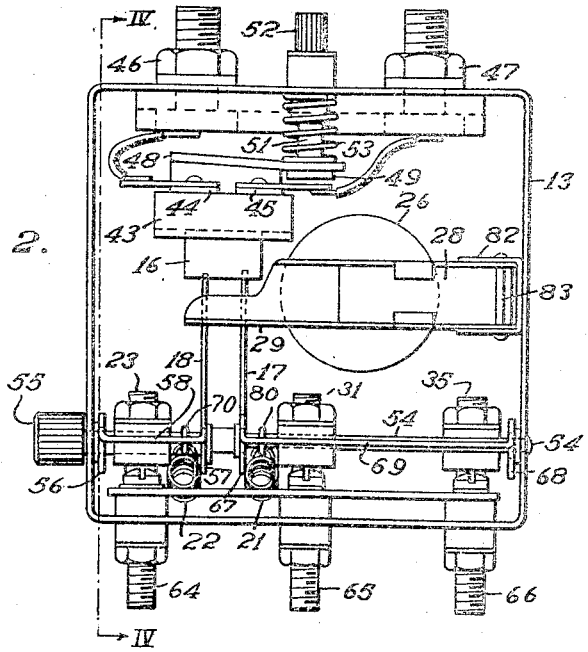
Fig. 2 is an enlarged end view of the relay device diagrammatically illustrated in Fig. 1.

When the apparatus is so unloaded and it is desired to reset the latch arm 18, a switch 27 that is provided in shunt relation to the lamp 25 may be closed, thus shunting the lamp from the above-traced circuit and increasing the energization of the coil 26 sufficiently to cause it to operate its associated armature 28 and an arm 29 controlled thereby to return the latch 18 to its initial position, as will be further described in detail. The armature 28 and the arm 29 actuated thereby for engaging the latch arms 17 and 18 are best shown in Figs. 2, 3, and 4, and are omitted from Fig. 1 for the sake of simplicity.

Should the overload on the apparatus continue sufficiently for the bimetal element 14 to continue the upward movement of the catch 16, the latch arm 17 will be released and operated by the spring 21 to cause movement of the contact member 31 into engagement with the contact member 32 to close a circuit through the opening winding 33 of the breaker 11, to actuate the contact members 34 from their circuit closing positions and interrupt the load circuit through the apparatus. When the apparatus has cooled sufficiently to permit return of the catch member 16 to a position to engage the latch arms 17 and 18, operation of the switch 27 to its circuit closing position to shunt the indicating device 25 from the indicating circuit and increase the energization of the coil 26 will effect movement of both latches 17 and 18 to their illustrated position to again be retained by the catch 16 until released by further operation. Upon return of the latch arm 17 to its latched position, a circuit is closed through contact members 35 and 36 for energizing the closing coil 37 of the circuit breaker 11, operating the contact members 34 to their circuit closing positions. The circuit through the contact members 35 and 36 may be so arranged that these contact members close one point only in the circuit, the final completion of the circuit being made by a manually operated switch after the circuit has been conditioned by closing of members 35 and 36.

The description thus far has been directed largely to the circuits and basic elements of the apparatus shown diagrammatically in Fig. 1. The detailed arrangement of the parts of the relay device 12 is shown in greater detail in the remaining figures of the drawings.

Figure 6:
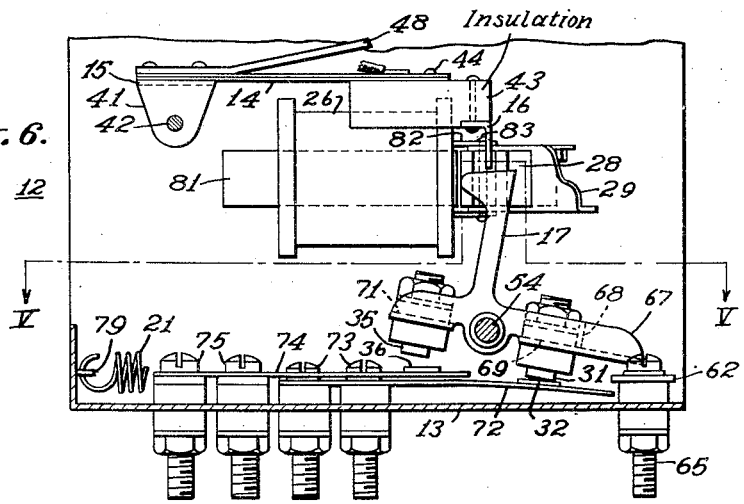
Fig. 6 is a vertical sectional view taken generally along the line VI—VI of Fig. 5, showing the latch released.
Figure 7:
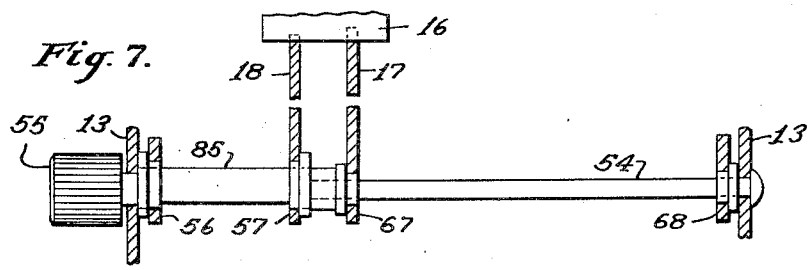
Fig. 7 is a detailed view.

Referring primarily to Figs. 3, 4 and 6, the bimetal element 14 is positioned with its relatively fixed end mounted on a yoke 15, the outer ends of which are turned down to form flanges 41 that are pivotally secured by a shaft 42 to the casing 13. The movable end of the bimetal 14 carries a molded insulating block 43 upon which the catch 16 is mounted. It will be noted, by reference to Fig. 3, that the bimetal element 14 is shown as of general U-shape, the terminals 44 and 45 of which are at the end mounted on the block 43 and are connected to terminal studs 46 and 47, respectively, mounted on the top of the casing 13. An adjusting arm 48 is attached to the yoke 15, the outer end of which is positioned above the head 49 of an adjusting bolt 51. The bolt extends through an opening in the end of the adjusting arm 48 and is provided with an adjusting nut 52 at its upper end. The adjusting arm is held in position by the spring 53 about the shaft of the bolt and positioned between the wall of the casing 13 and the adjusting arm 48. By adjusting the nut 52, the normal position of the arm 48 and the catch 16 may be raised or lowered, so that the device will operate at a selected predetermined temperature.

Figure 5:
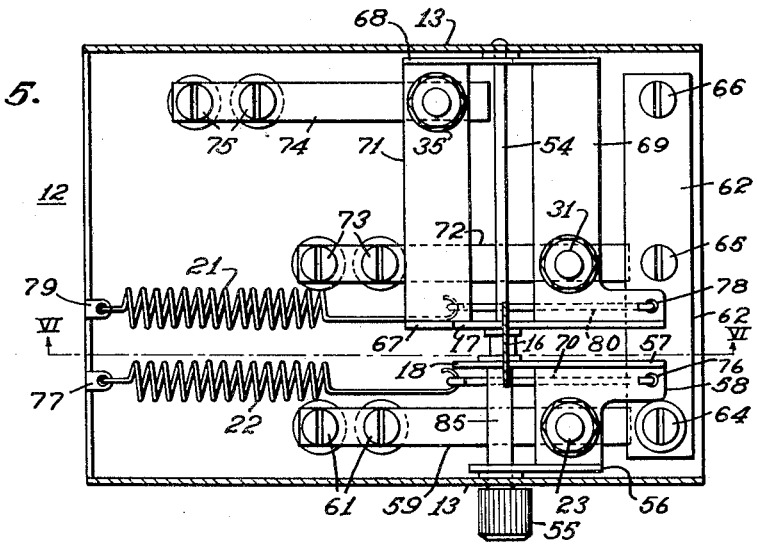
Fig. 5 is a horizontal sectional view taken generally along the line V—V of Fig. 6, with certain of the resetting parts of the device removed, and showing the catch in position to hold the latch arms in position.

As best shown in Figs. 2, 3 and 5, the latch members 17 and 18 are mounted on a shaft 54 extending from one side to the other of the casing 13 and provided on one end with an adjusting nut 55 for a purpose to be later explained. The latch member 18, in addition to the upwardly extending latch arm, is provided with vertical flange portions 56 and 57 connected by a horizontal portion 58. The vertical flanges are provided with openings forming the bearings about the shaft 54, and the horizontal connecting flat portion 58 carries the movable contact member assembly 23 which is adapted to engage the contact member 24 shown in Fig. 4. The contact member 24 is shown as mounted on a leaf spring 59 that is supported on studs 61, one of which acts as the terminal for conductor 7. The movable outer end of the leaf spring 59 engages a stop of insulating material 62 carried by studs 64, 65 and 66.

The latch member 17 is similarly constructed having vertical flange portions 67 and 68 provided with openings about the shaft 54 and two connecting horizontal portions 69 and 71, best shown in Fig. 5. The portion 69 carries the movable contact member 31, and the portion 71 carries the movable contact member 35. As best shown in Figs. 5 and 6, the contact member 31 is adapted to engage the contact member 32 mounted on a leaf spring 72 and supported on studs 73, one of which serves as the terminal for the circuit conductor leading to the tripping coil 33, and the flat portion 71 carries the movable contact member 35 that is adapted to engage the contact member 36 carried by the leaf spring 74 that is supported on studs 75, which serves as a terminal through which the circuit is completed to the closing coil 37.

As best shown in Figs. 3 and 5, an opening 76 is provided in the flat portion 68 of the latch 18 for receiving one end of a link 70 extending below the shaft 54 and connected to one end of the spring 22, the other end of the spring being attached to an opening in a lug 77 on the end of the casing 13. Similarly, an opening 78 is provided in the flat portion 69 of the latch member 17 for receiving one end of a link 80 extending below the shaft 54 and connected to one end of the spring 21, the other end of the spring being attached to an opening in a lug 79.

As best shown in Figs. 2, 3 and 4, the coil 26 of the resetting device is mounted on one leg of a U-shaped core structure 81, the other leg of which is supported in a channel 82 attached to the side wall of the casing 13. Through one end of the channel member 82 a hinge pin 83 is inserted for pivotally attaching the arm 29 that carries the armature 28, which is shown as being U-shaped, and having the outer ends or pole pieces positioned adjacent the pole pieces of the core member 81. The outer movable end of the arm 29 extends below the catch 16 to engage the upwardly extending arms of the latch members 17 and 18, upon sufficient energization of the coil 26. When so actuated the latches are moved in a counter-clockwise direction, as viewed in Fig. 4, the sloping upper edges 84 passing beneath the lower edge of the catch 16, raising it sufficiently for this purpose.

As previously explained, the relay is set to operate the second latch 17 by raising or lowering the adjusting arm 46 by means of the adjusting nut 52. In order to provide for adjusting the difference in temperature between the point at which the latch 17 is released and the point at which the latch 18 is released as the predetermined condition is approaching, the portion 85 of the shaft 54, upon which the latch member 18 is mounted is eccentric with respect to the axis about which the latch 17 is mounted, so that by turning the adjusting nut 55 the upwardly extending arm of the latch member 18 is raised and lowered, while the arm of the latch member 17 is not, thus adjusting for a greater or lesser elevation between the upper ends of these two latch arms with respect to the lower edge of the catch 16.

It will be noted that the circuit for energizing the indicating device 25 and the coil 26, as described above with respect to Fig. 1, moves the contact members 23 and 24, which are separated upon movement of the arm 29 toward the left, as viewed in Fig. 4, to force the latches 17 and 18 to their illustrated position in which they are normally retained by the catch 16. When the coil 26 is energized by closing the switch 27, shunting the device 25 from the circuit, the energization of the core and armature associated with the coil 26 is sufficient, and the inertia of the armature in motion is sufficient to carry the upwardly extending arms of the latch members past the catch 16 after separation of the contact members 23 and 24 which automatically deenergizes the coil 26.

It will be appreciated that changes in the circuits and arrangements of parts from those illustrated may be made within the spirit of my invention, and I do not wish to be limited otherwise than by the scope of the appended claims.

I claim as my invention:

1. In combination, an electrical apparatus, protective means therefor including a device responsive to predetermined conditions and having an element movable in accordance with variations in said conditions, a circuit breaker controlled by said movable element for closing a circuit upon a predetermined condition of the apparatus, a high impedance element and a resetting element included in said circuit, means controlled by said resetting element in and operable upon the short-circuiting of said high impedance means for resetting said circuit breaker to its initial position, and a short-circuiting switch for shunting said high impedance element from said circuit.

2. In combination, an electrical apparatus, protective means therefor including a device responsive to predetermined conditions, an element movable in accordance with variations in said conditions, a first movable member, means for causing actuation of said first movable member upon movement of said element in one direction to a certain point for closing an indicating circuit including a high impedance element and a resetting element, a second movable member, means for causing actuation of said second movable member upon further movement of said element in the same direction, and a short-circuiting switch for shunting said high impedance element from said circuit for increasing the energization of the setting element sufficiently for actuating said first and second movable elements to their initial positions.

3. In combination, an electrical apparatus, protective means therefor including a high impedance indicating device, an electric circuit for energizing said indicating device, a circuit breaker and control means therefor responsive to a predetermined condition of said apparatus for closing said electric circuit, means for resetting said breaker including a resetting element in said circuit, and means for shunting said high impedance device from said circuit for increasing the energization of said resetting element sufficiently for operating said circuit breaker to a position to interrupt said electric circuit.

4. In combination, an electrical apparatus, protective means therefor comprising an indicating circuit, a high impedance indicating device and a resetting device having a resetting element connected in series circuit relation in said circuit, a circuit breaker for completing said circuit, thermal means responsive to a predetermined condition of the apparatus for controlling the operation of said circuit breaker for closing said circuit, and a short-circuiting switch for shunting said high impedance device from said circuit for increasing the energization of said resetting device sufficiently for actuating said circuit breaker to its initial circuit interrupting position.

5. In combination, an electrical apparatus, protective means therefor comprising an indicating circuit including an indicating device and an operating coil of a resetting device in series circuit relation therewith, a circuit breaker for controlling the completion of said circuit having a latch arm and a catch member normally holding said latch arm to retain the circuit breaker in a position to maintain the indicating circuit open, thermal means responsive to a predetermined condition of the apparatus for moving said catch member to release said latch arm and effect the closing of said indicating circuit, the indicating device having an impedance great enough to prevent operation of said resetting device so long as the indicating device remains in series therewith, and a switch for short-circuiting said indicating device for increasing the energization of the operation coil of said resetting device sufficiently for operating said circuit breaker to its initial position for interrupting the indicating circuit.

6. In combination, an electrical apparatus, protective means therefor including a device responsive to predetermined conditions of the apparatus and having a thermal element movable in accordance with variations in said conditions, a catch member actuated thereby, a first latch arm, means for causing actuation of said first latch arm upon movement of said catch member to a certain point for closing an indicating circuit, a high impedance indicating element connected in said circuit and a resetting device having a winding connected in said circuit, a second latch arm, means for causing actuation of said second catch arm upon further movement of said catch member in the same direction for interrupting the load on the electrical apparatus, a switch for short-circuiting said indicating device for increasing the energization of the winding of the resetting device, and an armature actuated by the winding upon such increase in energization for actuating said first and second latch arms to their initial positions to be retained by said catch member.

7. In combination, an electrical apparatus, protective means therefor including a high impedance indicating device, an electric circuit for energizing said device, a circuit breaker responsive to a predetermined condition of said apparatus for closing said electric circuit, means in said circuit for resetting said breaker, the indicating device having an impedance great enough to prevent operation of said resetting device so long as the indicating device remains in series circuit relation therewith, and means for shunting said high impedance device from said circuit for increasing the energization of said resetting means sufficiently for moving said circuit breaker to its original position to interrupt said electric circuit.

8. In combination, an electrical apparatus, protective means therefor comprising an indicating circuit, a high impedance indicating device and a resetting device having a magnet coil in series circuit relation in said indicating circuit, a circuit breaker for completing said circuit normally latched in an open circuit position and biased to a circuit closing position, thermal means responsive to a predetermined condition of the apparatus for unlatching said circuit breaker for closing said circuit, and a short-circuiting switch for shunting said high impedance device from said circuit for increasing the energization of said resetting device sufficiently for actuating said circuit breaker to its initial circuit interrupting position.

MERRILL G. LEONARD.